United States Patent [19]
Granatowicz et al.

[11] Patent Number: 6,153,686
[45] Date of Patent: Nov. 28, 2000

[54] HIGH MODULUS BELT COMPOSITION AND BELTS MADE THEREWITH

[75] Inventors: Daniel Stanley Granatowicz; Matthew Thomas Morris, both of Lincoln, Nebr.; Mervin Victor Pilkington, Akron; Gary Richard Tompkin, Copley, both of Ohio

[73] Assignee: The GoodYear Tire & Rubber Company, Akron, Ohio

[21] Appl. No.: 09/267,876

[22] Filed: Mar. 11, 1999

Related U.S. Application Data

[63] Continuation-in-part of application No. 08/816,973, Mar. 13, 1997, abandoned.

[51] Int. Cl.[7] .................................................... C08L 9/02
[52] U.S. Cl. ........................... 524/511; 525/133; 525/139
[58] Field of Search ................................. 525/139, 133; 524/511

[56] References Cited

U.S. PATENT DOCUMENTS

| | | | |
|---|---|---|---|
| 4,031,768 | 6/1977 | Henderson et al. | 74/233 |
| 4,244,234 | 1/1981 | Standley | 474/263 |
| 4,634,726 | 1/1987 | Martin | 524/34 |
| 4,990,570 | 2/1991 | Suito | 525/254 |
| 5,208,294 | 5/1993 | Brown | 525/263 |
| 5,370,915 | 12/1994 | Hirakawa | 428/36.8 |
| 5,405,690 | 4/1995 | Hirkawa | 428/327 |
| 5,501,908 | 3/1996 | Shioyama | 428/395 |
| 5,599,246 | 2/1997 | Fujiwara et al. | 474/205 |
| 5,731,371 | 3/1998 | Nesbitt et al. | 524/11 |
| 5,830,946 | 11/1998 | Ozawa et al. | 525/65 |

FOREIGN PATENT DOCUMENTS

| | | | |
|---|---|---|---|
| 0 674 121 | 3/1995 | European Pat. Off. | F16G 1/28 |
| 3618907 A1 | 11/1987 | Germany | B32B 25/10 |
| 3918929 A1 | 12/1989 | Germany | C08L 9/02 |

OTHER PUBLICATIONS

Article by Trevor Brown: "Compounding for Maximum Heat Resistance and Load Bearing Capacity in HNBR Belts"; *Rubber World* Magazine Oct., 1993; p. 53.

Article by Trevor Brown: "Using HNBR to Improve Belt Compounds"; *Rubber & Plastic News*; Jun. 7, 1993; p. 45.

Paper by Robert C Klingender: "Use of Highly Saturated Nitrile in Rubber Roll Coverings"; Jan. 31, 1990.

*Primary Examiner*—Patricia A. Short
*Attorney, Agent, or Firm*—Nancy T Krawczyk

[57] ABSTRACT

A high modulus composition based on a mixture of a hydrogenated acrylonitrile butadiene rubber which has been modified with either zinc methacrylate or a combination of zinc oxide and methacrylic acid and an unmodified hydrogenated acrylonitrile butadiene rubber for use in high load-bearing synchronous drive belts and belts made therewith.

4 Claims, No Drawings

HIGH MODULUS BELT COMPOSITION AND BELTS MADE THEREWITH

RELATED U.S. APPLICATION DATA

The present U.S. patent application is a continuation-in-part of U.S. patent application Ser. No. 08/816,973, filed Mar. 13, 1997, now abandoned.

FIELD OF THE INVENTION

This invention relates to a high modulus elastomeric composition particularly suited for use in high load-bearing synchronous drive belts. More specifically, the present invention is directed to a high modulus elastomeric composition which exhibits both a high modulus and high elongation.

BACKGROUND OF THE INVENTION

The use of hydrogenated acrylonitrile-butadiene (HNBR) rubber in belts, particularly for automotive use, has been suggested in the past. See e.g. articles by Trevor A. Brown: "Compounding for Maximum Heat Resistance and Load Bearing Capacity in HNBR Belts", *Rubber World magazine*, October 1993, page 53, and "Using HNBR to Improve Belt Compounds", *Rubber & Plastics News*, Jun. 7, 1993, page 45. See also U.S. Pat. No. 5,405,690. There are, however, no suggestions on what the composition should be.

U.S. Pat. No. 5,405,690 discloses the use of HNBR modified with 20 to 60 ppw methacrylic acid and 10–60 ppw zinc oxide. The modified compound is noted as being commercially available as ZSC 2295 from the Nippon Zeon Company. It is also disclosed that the modified HNBR may be blended with a limited amount of HNBR. However, U.S. Pat. No. 5,405,690 is silent about the physical properties of the disclosed compound, and teaches that the compound must be bonded to another rubber layer of defined physical properties in order to obtain the desired adhesion characteristics.

The ZSC-2295 disclosed by U.S. Pat. No. 5,405,690 is a known commercially available composition. The 1997 Rubber World Blue Book disclosed that the composition is an HNBR modified with methacrylic acid and zinc oxide. Nippon Zeon also discloses this commercially available compound in DE 39 18 929 A1.

Fujiwara, in U.S. Pat. No. 5,599,246 and EP 674121A1, discloses using a modified HNBR, specifically using the ZSC-2295, in a belt composition. The modified HNBR is blended with unmodified HNBR, blending 10–40 ppw of the modified HNBR with 90–60 ppw of unmodified HNBR so that the amount of zinc methacrylate is between 4 to 20 percent of the rubber compound. Fujiwara teaches that if the amount of zinc methacrylate becomes greater than 20 ppw of the total rubber composition, fatigue of the tensile body occurs.

Saito, in U.S. Pat. No. 4,99,570, discloses a rubber composition comprising HNBR modified with 10 to 100 ppw of a zinc salt of a methacrylic acid. Silicic anyhdride is used for improving the abrasion resistance of the compound.

Klingender, in "Use of Highly Saturated Nitrile in Rubber Roll Coverings," discloses the uses and possible modifications to HNBR. Klingender discloses modifying HNBR with zinc oxide and methacrylic acid for improved tensile strength and elongation. Klingender discloses combining the modified HNBR with unmodified HNBR, resulting in high tensile strengths. However, the tensile strengths disclosed are unrealistic for use as taught since the formulations are pure gum recipes without any filler. t is taught that for reduced amounts of carbon black and high amounts of the modified HNBR, the tensile strength and elongation are increased. All of the compositions disclosed by Klingender are for the use of rubber rolls or roll coverings. While it is required that such rubber compositions exhibit a high tensile strength due to the repeated contact with opposing roller and the product being calendered, it is not required that the rubber composition exhibit a very high elongation since there will not be repeated flexing of the rollers.

SUMMARY OF THE INVENTION

The disclosed composition is particularly useful in high load-bearing synchronous drive belts.

In accordance with the practice of the present invention, there is provided an elastomeric composition which exhibits both high modulus and high elongation.

In accordance with a further aspect of the present invention, there is provided an elastomeric composition which has a modulus at 10% elongation of 5.2 to 7.25.

In accordance with the present invention, there is provided an elastomeric composition comprising from 50 to 95 parts by weight per 100 parts of rubber (phr) of an HNBR modified with either zinc methacrylate or a combination of zinc oxide and methacrylic acid.

In accordance with a further aspect of the present invention, there is provided an elastomeric composition comprising from 50 to 95 parts by weight per 100 parts of rubber (phr) of an HNBR modified with either zinc methacrylate or a combination of zinc oxide and methacrylic acid wherein the elastomeric composition contains 20 to 38 phr of zinc methacrylate.

DETAILED DESCRIPTION OF THE PREFERRED EMBODIMENTS

Synchronous drive belts are typically formed with a body formed of elastomeric composition, reinforcing tensile members, and at least one row of adjacent teeth. the belt teeth contact a pulley surface and the interaction between the teeth and the pulley drives the system. Because of the constant flexing of the belt, the composition forming the belt must exhibit a high modulus of elasticity and a high elongation. In many elastomeric compositions, these properties cannot both be optimized, as an increase in property yields a corresponding loss of the other.

In the present invention, two different elastomeric compositions are combined to achieve the desired properties. The first component is 50 to 95 parts by weight of a modified HNBR. The second component is 5 to 50 parts by weight of an unmodified HNBR.

The first component, the modified HNBR, is HNBR modified with either 20–60 ppw zinc methacrylate or a combination of 10–60 ppw zinc oxide and 20–60 ppw methacrylic acid. When using a combination of zinc oxide and methacrylic acid, the oxide and acid interact to form zinc methacrylate during the mixing process.

A typical example of an HNBR modified with zinc oxide and methacrylic acid is commercially available as Zetpol ZSC0-2295 from Nippon Zeon Co. An unmodified HNBR is also available as Zetpol 2020, also from Nippon Zeon Co.

In combining the modified HNBR and unmodified HNBR, the final amount of zinc methacrylate in the rubber compound is within the range of at least 20 to at most 38 parts by weight. If the amount of zinc methacrylate is less than 20 pbw, than the modulus of the composition is too low, and when employed as a belt composition, there is insufficient tooth stiffness. If the amount of zinc methacrylate is greater than 38 pbw, then the modulus is sufficient, however, the elongation characteristics are insufficient for the desired use in a belt.

The composition requires a peroxide cure co-agent. Typical of the peroxide cure co-agents are trimethylolpropane trimethacrylate, trifunctional organosiloxanes, triallyl cyanurate and triallyl isocyanurate. While from 0.5 to 10 phr of the co-agent can be used, 3 to 6 phr are preferred. The use of the additional co-agent is essential to incorporation of the reinforcing carbon black, and it improves the compounding characteristics for the mixture.

Organic peroxides are also used. Typical of the organic peroxides which can be used with the invention are 1,3-bis (t-butylperoxy-1-propyl) benzene, dicumyl peroxide and, -bis(t-butylperoxy) valerate. While 0.25 to 20 phr of the peroxide can be used, 1.5 to 4.5 phr are preferred.

Phenolic resins are also used in the composition. Typical of the phenolic resins which can be used are phenol formaldehyde resins. Preferred is an oil-modified thermosetting phenol formaldehyde resin. While from 1 to 20 phr of the phenolic resin can be used, from 6 to 12 phr are preferred. It is believed that the phenolic resin provides a high level of adhesion to the reinforcement in the cured belts as well as allows the belts to be built on conventional elastomer processing equipment without the use of solvents.

In addition to those ingredients listed above, the composition can contain other materials customarily used in rubber compounding such as fillers, antioxidants, antiozonants, processing aids, etc. Particularly preferred is from 5 to 50 phr of a N330 carbon black.

The composition of the invention has been found to provide synchronous drive belts with teeth having sufficient rigidity without the use of fiber reinforcement. As a measure of this property, it is preferred that the modulus at 10% elongation be from 5.2 to 7.25 MPa. It is also preferred that the ultimate elongation of the composition be very high.

The following tables set forth compositions within the scope of the present invention and comparison compositions.

| Compound | A | B | C | G | E |
|---|---|---|---|---|---|
| Modified HNBR[1] | 100 | 0 | 70 | 70 | 50 |
| Unmodified HNBR[2] | 0 | 100 | 30 | 30 | 50 |
| Carbon Black | 30 | 30 | 30 | 30 | 30 |
| Peroxide co-agent[3] | 5 | — | 4.2 | 4.2 | 4.2 |
| Organic peroxide[4] | — | — | 3 | 3 | 3 |
| Phenolic resin | — | — | 10 | 6 | 2 |
| Tensile Properties | | | | | |
| Modulus, 10%, psi | 11.4 | 0.6 | 7.2 | 5.9 | 5.2 |
| Elongation, % | 100 | 488 | 323 | 302 | 18.6 |

[1]Zetpol ZSC-2295, from the Nippon Zeon Chemical Co.
[2]Zetpol 2020, from the Nippon Zeon Chemical Co.
[3]trimethylolpropane trimethacrylate
[4]1,3-bis(t-butylperoxy-1-propyl) benzene Compound A is comprised of HNBR modified with zinc oxide and methacrylic acid. The compound exhibits a very high modulus at 10%, and the ultimate elongation of the compound is only 100%. Thus while the compound may exhibit good tooth formation, the belt life would be severely limited due to the relative inextensibility of the compound.

Compound B is comprised of unmodified HNBR. This compound exhibits properties that are the reverse of Compound A. The compound exhibits very high elongation properties but very poor modulus properties. Thus tooth formation would be poor, resulting in early belt failure.

Compounds C through E exhibit elongation greater than Compound A, and a modulus value greater than for Compound B. The compounds provide the desired flexibility and tensile strength to provide for good tooth formation and sufficient belt life.

While certain representative embodiments and details have been shown for the purpose of illustrating the invention, it will be apparent to those skilled in this art that various changes and modifications may be made therein without departing from the spirit or scope of the invention. It is, therefore, to be understood that changes can be made in the particular embodiments described which will be within the full intended scope of the invention as defined by the following appended claims.

What is claimed is:

1. An elastomeric composition characterized by:

a) from 50 to 95 parts by weight per 100 parts of rubber (phr) of an HNBR modified with either 20–60 phr zinc methacrylate or a combination of 10–60 phr zinc oxide and 20–60 phr methacrylic acid;

b) from 5 to 50 phr of an unmodified HNBR;

c) from 0.5 to 10 phr of a peroxide cure co-agent;

d) from 0.25 to 20 phr of an organic peroxide;

e) from 1 to 20 phr of a phenolic resin; and f) from 5 to 50 phr of carbon black;

wherein the elastomeric composition contains 20 to 38 phr of zinc methacrylate and has a modulus at 10% elongation of 5.2 to 7.25 MPa.

2. The composition according to claim 1 wherein the peroxide cure agent is trimethylolpropane trimethacrylate.

3. The composition of claim 1 wherein the peroxide is, -bis(t-butylperoxy) valerate.

4. A power transmission belt produced from an elastomeric composition characterized by:

a) from 50 to 95 parts by weight per 100 parts of rubber (phr) of an HNBR modified with either zinc methacrylate or a combination of zinc oxide and methacrylic acid;

b) from 5 to 50 phr of an unmodified HNBR;

c) from 0.5 to 10 phr of a peroxide cure co-agent;

d) from 0.25 to 20 phr of an organic peroxide; and e) from 1 to 20 phr of a phenolic resin and f) from 5 to 50 phr of carbon black, wherein the elastomeric has a modulus at 10% elongation of 5.2 to 7.25 MPa and a very high ultimate elongation.

* * * * *